United States Patent Office 3,027,313
Patented Mar. 27, 1962

3,027,313
PRODUCTION OF INSULATING COATINGS ON METAL
Arthur John Halstead Darlaston, New Barnet, and Mervyn William Alston, London, England, assignors to Siemens Edison Swan Limited, London, England, a company of Great Britain
No Drawing. Filed Apr. 16, 1959, Ser. No. 806,782
Claims priority, application Great Britain Apr. 22, 1958
2 Claims. (Cl. 204—181)

This invention relates to insulating coating materials capable of being applied to the surface of a metal to be coated by cataphoresis. The invention is especially, although not exclusively, concerned with the production of an insulating coating on the heaters for the indirectly heated cathodes of thermionic valves.

Indirectly heated cathodes for thermionic valves generally comprise a tubular outer metal sheath coated with an electron emitting substance, such as a mixture of one or more alkaline earth oxides, and an internal convoluted heating element through which the heating current is passed, the heater being insulated from the metal sheath to avoid short-circuiting any of the convolutions of the heating element. The heating element may be connected at one end to the metal tube. In order to coat the heating element with an insulating substance to provide effective insulation, it is common practice to apply an adherent coating of powdered alumina to a metal core in the form of wire. The coating is frequently effected by cataphoresis; in this process, the wire to be coated is drawn through or dipped into a suspension, in demineralised or distilled water, of powdered alumina, the suspension also containing compounds which provide the required negative radicle of the electrolyte. Aluminum nitrate and magnesium nitrate have been found to be suitable compounds for the purpose, provided that the aluminum nitrate has been previously subjected to an extensive process of dehydration.

The object of the present invention is to provide an electrolyte for use in the cataphoretic coating of the surface of the metal member with an insulating layer which avoids the hitherto necessary dehydration of the aluminum nitrate.

According to the invention, the dehydrated aluminum nitrate in the electrolyte is replaced by zirconium nitrate.

A processing of providing an electrically insulating coating on a metal member, according to the invention, consists in immersing the metal member in an electrolyte containing powdered alumina in suspension and applying between said member and a metal electrode in contact with the electrolyte an electric potential such that said member is negative with respect to said electrode, said electrolyte comprising zirconium nitrate dissolved in an aqueous vehicle.

A suspension for use in applying a coating material including zirconium nitrate to the surface of a metal member, according to a feature of the invention, comprises alumina, zirconium nitrate, magnesium nitrate and an aqueous vehicle which is conveniently a mixture of methylated spirit and water.

The suspension may be prepared by dissolving the nitrate in distilled or demineralised water, adding the alumina, and finally adding the methylated spirit. The mixture is then intimately mixed to obtain a uniform suspension. The mixing may be effected by rotating on rollers a cylindrical bottle containing the previously mixed ingredients.

An example of a suitable formula for the suspension is as follows:

| | |
|---|---|
| Alumina | gm__ 2000 |
| Zirconium nitrate | gm__ 28 |
| Magnesium nitrate | gm__ 40 |
| Water | ml__ 1200 |
| Methylated spirit | ml__ 2000 |

The ingredients should be of the quality demanded by the degree of insulation required; A.R. quality is suitable.

The metal to be coated is immersed in a bath containing the suspension prepared as above described and coating is effected in known manner by connecting the metal to the negative terminal of a source of direct current voltage of about 20 volts, the container in which the suspension is located, if of metal, being connected to the positive terminal of the source. Alternatively, a metal anode may be immersed in the bath.

What we claim is:
1. A process for producing an electrically insulating coating on a metal wire, which consists in passing said wire through an aqueous electrolyte containing magnesium nitrate and zirconium nitrate in solution and having powdered alumina suspended therein, and applying an electric potential of about 20 volts between said wire and an electrically conducting electrode in contact with said electrolyte with said wire at a negative potential with respect to said electrode the electrolyte containing, by weight, about 0.83% magnesium nitrate about 0.57% zirconium nitrate about 40.6% $Al_2O_3$, about 24.5% demineralised water, and about 33.5% methylated spirit.

2. A suspension for use in producing by electrophoresis an insulating coating on a metal member consisting essentially of 2,000 gm. aluminum oxide, 28 gm. zirconium nitrate, 40 gm. magnesium nitrate and about 3,200 ml. of an aqueous vehicle.

References Cited in the file of this patent
UNITED STATES PATENTS
2,307,018   Cardell _____ Jan. 5, 1943

FOREIGN PATENTS
650,753   Great Britain _____ Mar. 7, 1951
677,322   Great Britain _____ Aug. 13, 1952